(12) United States Patent
Pickreign et al.

(10) Patent No.: US 6,539,338 B1
(45) Date of Patent: Mar. 25, 2003

(54) SELF-DIAGNOSTIC TESTING OF A NETWORK INTERFACE ADAPTER

(75) Inventors: Heidi R. Pickreign, Harvard, MA (US); Laxminarayan Krishnamurthy, Acton, MA (US); Christopher J. Duguay, Winchendon, MA (US)

(73) Assignee: 3Com Corporation, Santa Clara, CA (US)

( * ) Notice: Subject to any disclaimer, the term of this patent is extended or adjusted under 35 U.S.C. 154(b) by 281 days.

(21) Appl. No.: 09/591,045

(22) Filed: Jun. 9, 2000

(51) Int. Cl.[7] ............................................... G06F 11/27
(52) U.S. Cl. ..................... 702/185; 455/115
(58) Field of Search ............................... 702/185, 183, 702/184, 182, 117, 118, 119, 81, 57, 58, 59; 455/423, 115, 9, 226.1, 226.4; 703/13, 14, 16, 20, 21, 22, 23, 24, 25, 26; 710/22, 23; 711/2, 101; 712/220, 225; 714/100, 1, 2, 4, 5, 6, 25, 29, 30, 31, 47, 52

(56) References Cited

U.S. PATENT DOCUMENTS

| | | | | |
|---|---|---|---|---|
| 5,313,197 A | * | 5/1994 | Barr et al. .................. | 340/7.21 |
| 5,390,188 A | * | 2/1995 | Dawson ....................... | 714/706 |
| 5,432,923 A | * | 7/1995 | Taniguchi et al. .......... | 710/107 |
| 5,522,046 A | * | 5/1996 | McMillen et al. .......... | 370/217 |
| 5,764,726 A | * | 6/1998 | Selig et al. .................... | 379/21 |
| 5,812,826 A | * | 9/1998 | McLain, Jr. ................. | 703/27 |
| 5,956,324 A | * | 9/1999 | Engdahl et al. ............. | 370/242 |
| 5,966,428 A | * | 10/1999 | Ortiz Perez et al. ..... | 379/27.02 |
| 6,216,236 B1 | * | 4/2001 | Miyao et al. ............... | 713/500 |
| 6,240,534 B1 | * | 5/2001 | Nakane ....................... | 700/79 |

\* cited by examiner

Primary Examiner—Marc S. Hoff
Assistant Examiner—Edward Raymond
(74) Attorney, Agent, or Firm—Weingarten, Schurgin, Gagnebin & Lebovici LLP

(57) ABSTRACT

A method and apparatus for implementing a self-diagnostic capability in a network interface adapter in which failure data is provided to a host processor. The host processor may report the failure data to a user or additionally the host processor may attempt to correct predetermined faults in code images by writing a valid code image to a memory on the network interface adapter.

15 Claims, 7 Drawing Sheets

SELF-DIAGNOSTIC TESTING OF A NETWORK INTERFACE ADAPTER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates generally to the field of testing of electronic equipment and more particularly to the execution of self diagnostic tests within a network interface adapter.

In a typical computer system interconnected to a network, a network-interface-adapter (NIA) acts as an interface between the host computer and a computer network. The NIA performs the necessary interface functions for transmitting and receiving data over the computer network. Typical NIAs are controlled by state machines or hard wired controllers and do not possess a dedicated processor. Accordingly, the NIAs typically rely upon the use of a processor within an associated host computer to perfrom perform diagnostic testing of the network interface adapter once the adapter is installed within or coupled to the host computer.

In the circumstance in which the NIA is coupled to the host computer, the ability of the host computer to diagnose internal operational capabilities of the NIA may be limited. In particular, functions on the NIA may not be visible to the host computer and suitable inputs or outputs may not be accessible to allow for the diagnose of failures with respect to such functions. Consequently, the host computer cannot monitor all of the systems and circuits contained on the NIA. Accordingly, the host computer may not be able to thoroughly test the NIA and problems on the NIA may be undetectable by a diagnostic routine executing on the host processor.

Additionally, during the manufacture of each NIA it is desirable to be able to verify the operation of the device prior to installation of the NIA within a system. In NIAs with limited intelligence, a computer or test station is typically employed to perform fault diagnosis on the NIAs. Such test equipment is usually costly and ongoing maintenance of the test equipment is desirable. It is therefore desirable to be able to minimize the need for and complexity of test equipment employed in the manufacturing process.

It would therefore be desirable to have a NIA that is capable of executing self-diagnostics to verify the basic operation of the NIA prior to installation and during ongoing use of the device within a system. If would further be desirable for the NIA to be able to identify predetermined faults which are capable of being corrected and to repair such faults if possible.

BRIEF SUMMARY OF THE INVENTION

A method and apparatus is disclosed for implementing self-diagnostic capability within a network interface adapter (NIA) and correcting predetermined faults detected during the self diagnostic testing of the network interface adapter. The NIA includes a host processor that is coupled to a Read Only Memory, Instruction and Data RAMs, a flash RAM and registers and is employed in the communication of information between the NIA processor and a host computer. In response to an indication of a power up condition or a reset condition, the NIA processor executes certain instructions within the ROM to access a self diagnostic code image contained within the flash RAM and to load the self diagnostic code image into predetermined locations within the instruction RAM within the NIA. The NIA processor then commences execution of the self diagnostic code to test basic functions within the NIA. Errors detected during execution of the self diagnostic routines are reported to the host computer, if possible. In the event of the detection of an error within the flash RAM, the host processor is operative to initiate a sequence to correct the failure by reprogramming at least the portion of the flash RAM that caused the error indication during the diagnostic test. Code stored in the host computer may be downloaded for purposes of correcting the errant code. Alternatively, redundant code stored in another portion of the flash RAM or in another memory device may be employed in place of the flash RAM code upon detection of an error within such code.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

A method and system consistent with the present invention for performing self-diagnostic testing of a network interface adapter (NIA) is disclosed. In certain predetermined circumstances, fault conditions detected during the self diagnostic process are correctable under the control of a processor within the NIA.

Figure 1:
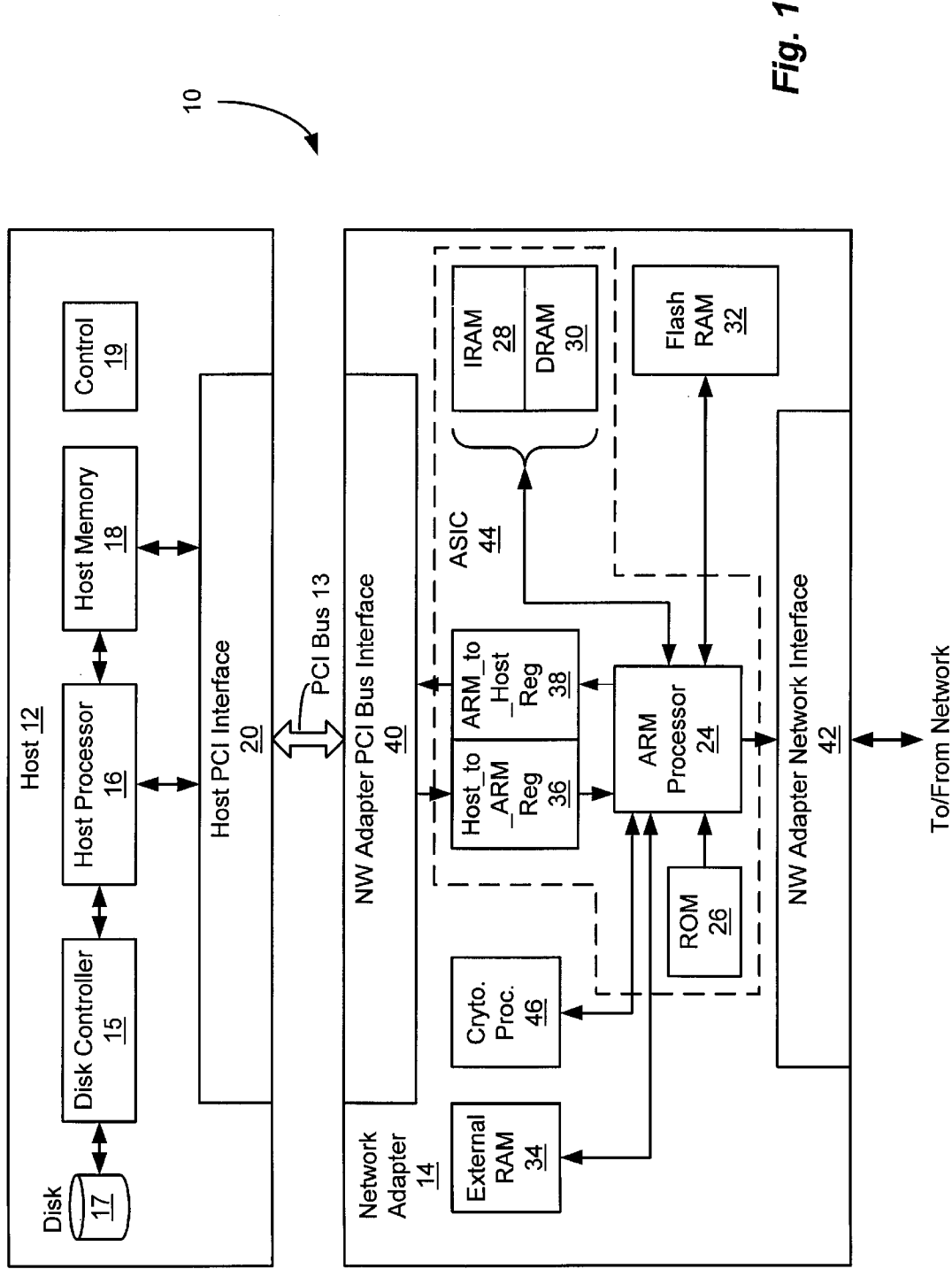
FIG. 1 is a block diagram of a system that includes a network interface adapter operative to perform self diagnostic testing in accordance with the presently disclosed invention.

FIG. 1 illustrates a system 10 that includes a NIA 14 that is capable of performing self-diagnostic testing of the NIA 14 and repair of certain predetermined faults that are detected during the self diagnostic process executing under the control of a NIA processor 24. The processor may comprise an ARM processor integrated on an application specific integrated circuit 44 with other components as discussed later in greater detail. The NIA 14 includes a PCI interface 40 that couples the network interface processor 24 to a PCI bus 13 via Host_to_ARM Registers 36 and ARM_to_Host registers 38. In the presently disclosed embodiment, the Host_to_ARM registers comprise 8 registers that may be read by the NIA processor 24 and the ARM_to_Host registers comprise 4 registers that may be loaded by the NIA processor 24. A ROM 26, External RAM 34, Instruction RAM 28, Data RAM 30, and flash RAM 32 are coupled to the NIA processor 24 to enable the processor 24 to read and write instructions and data from and to the respective memories, as applicable. A cryptographic processor 34, may be coupled to the NIA processor 24. The cryptographic processor 34 is employed to accelerate cryptographic functions within the NIA 14. The NIA processor 24 is also coupled to a NIA network interface 42 which is coupled to a network to permit reception and transmission of information over the network.

In the presently disclosed embodiment, the NIA is coupled to a host computer 12 via a host PCI interface 20. The host computer 12 includes a host processor 16, a host memory 18 and control logic 19. The host processor 16 is communicably coupled to the host memory 18 and the host PCI interface 20. The host computer 12 also includes a disk controller 15 coupled to the host processor 16, and a disk such as a hard disk CD-ROM 17 that is coupled to the disk controller 15. The disk may be used to store various factory data, software program images, or other configuration data as appropriate. Other magnetic, optical, or electrical non-volatile memory capable of storing the desired information may be employed in lieu of an addition to the disk 17.

The NIA 14 may be fabricated integrally on a motherboard with host computer electronics or alternatively as a separate network interface adapter card that couples to the host computer via a suitable interface such as the PCI bus 13.

As indicated above, the NIA processor 24 may comprise an ARM processor. The ARM processor may be integrated on the ASIC 44 along with the ROM 26, IRAM 28, DRAM 30, Host_to_ARM registers 36 and ARM_to_Host registers 38. The Host_to_ARM registers 36 are employed in the transmission of information from the host computer 12 to the NIA 14 and the ARM_to_Host registers 38 are employed in the transmission of information from the NIA 14 to the host computer 14. More specifically, the host processor 16 writes information to the Host_to_ARM registers 36 via the host PCI interface 20, the PCI bus 13 and the NW Adapter PCI interface 40. The Host_to_ARM registers 36 may be read by the NIA processor 24. Additionally, the NIA processor can write information to the ARM_to_Host registers 38 and the information within these registers can be read by the host processor 16 via the Host PCI interface 20, the PCI bus 13 and the NW adapter PCI interface 40.

Figure 2:
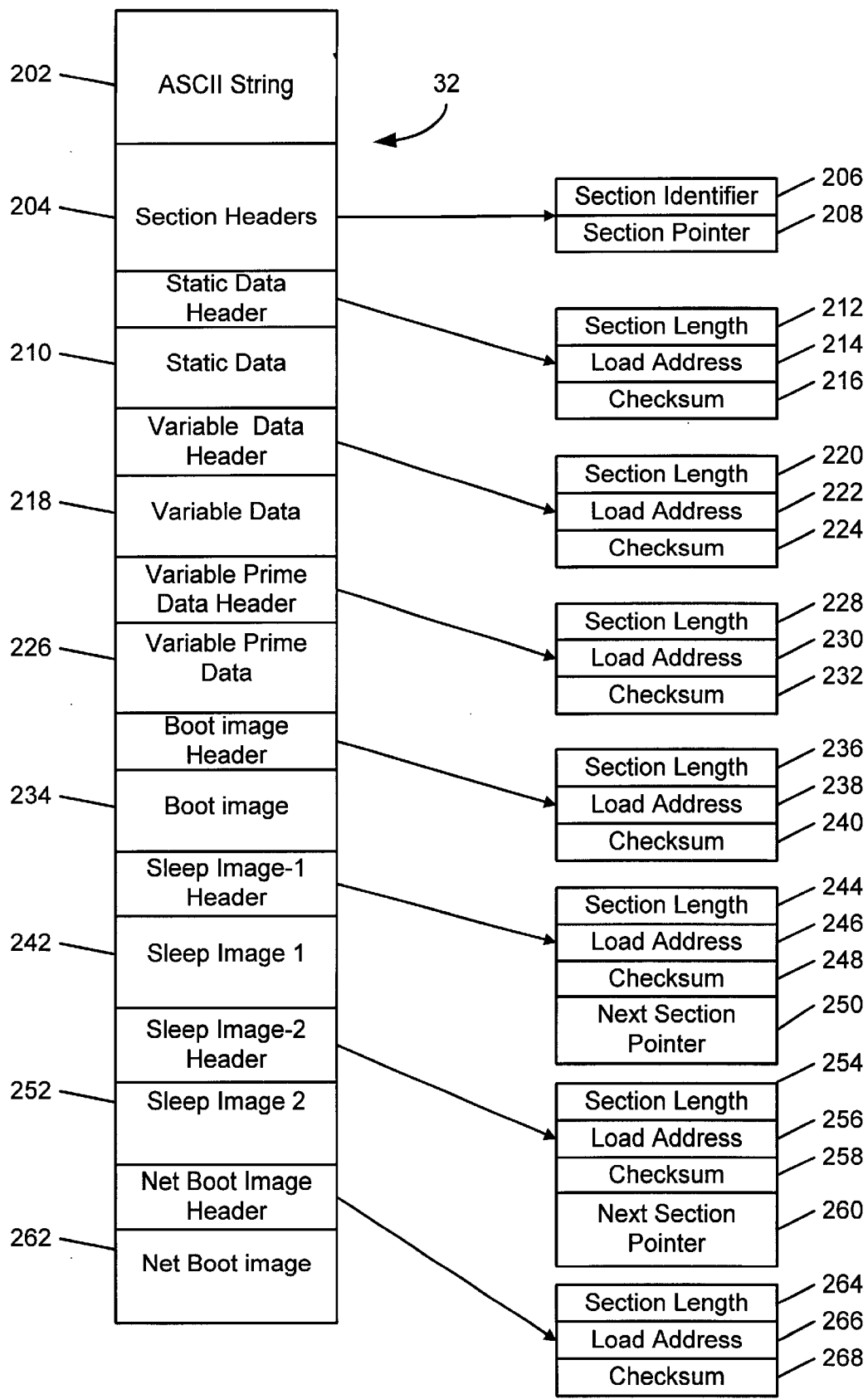
FIG. 2 is a graphical illustration of a memory map of an exemplary flash RAM consistent with the apparatus and method for implementing a self-diagnostic capability.
Figure 3A:
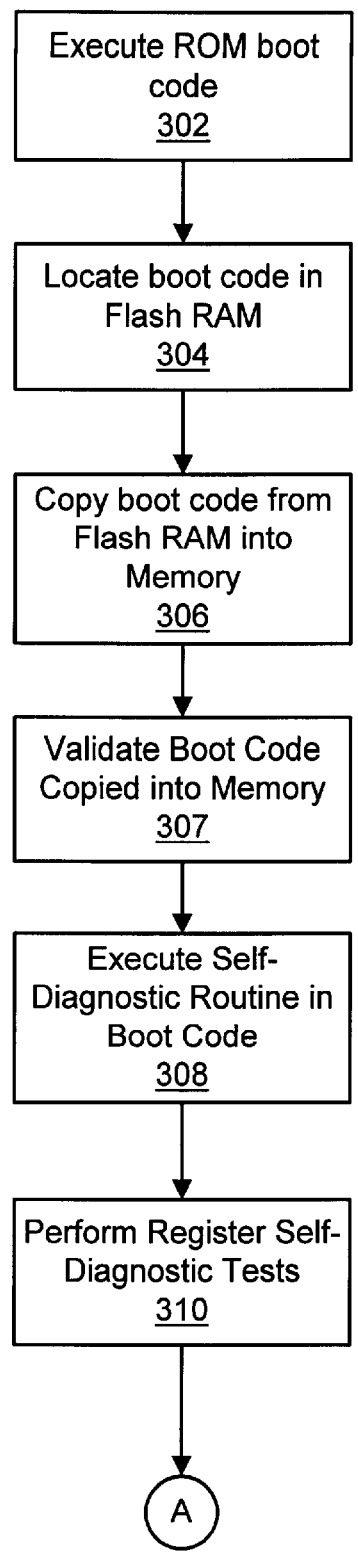
FIGS. 3A–3E are a flow chart illustrating one embodiment of a method for implementing a self-diagnostic capability.
Figure 3B:
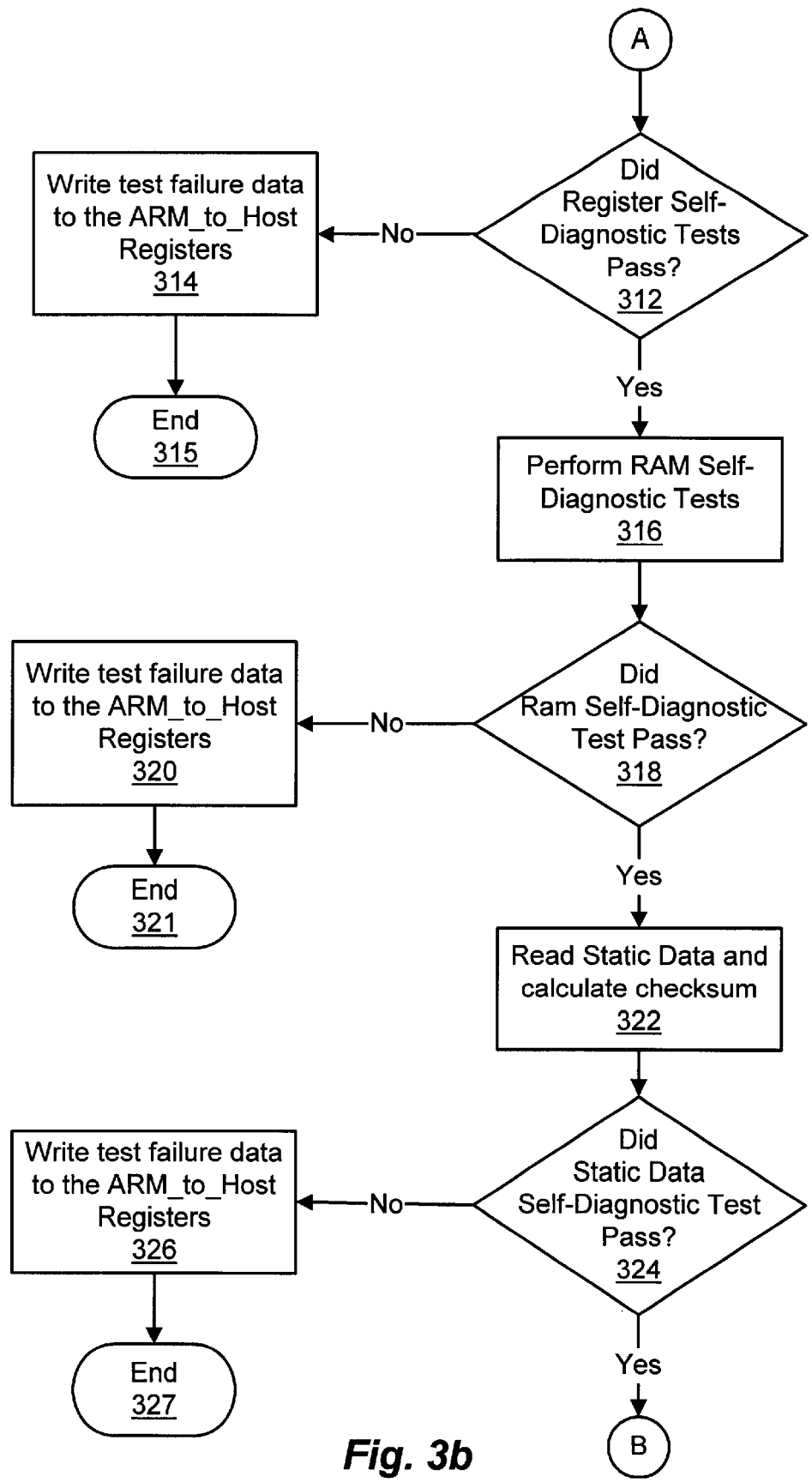
Figure 3C:
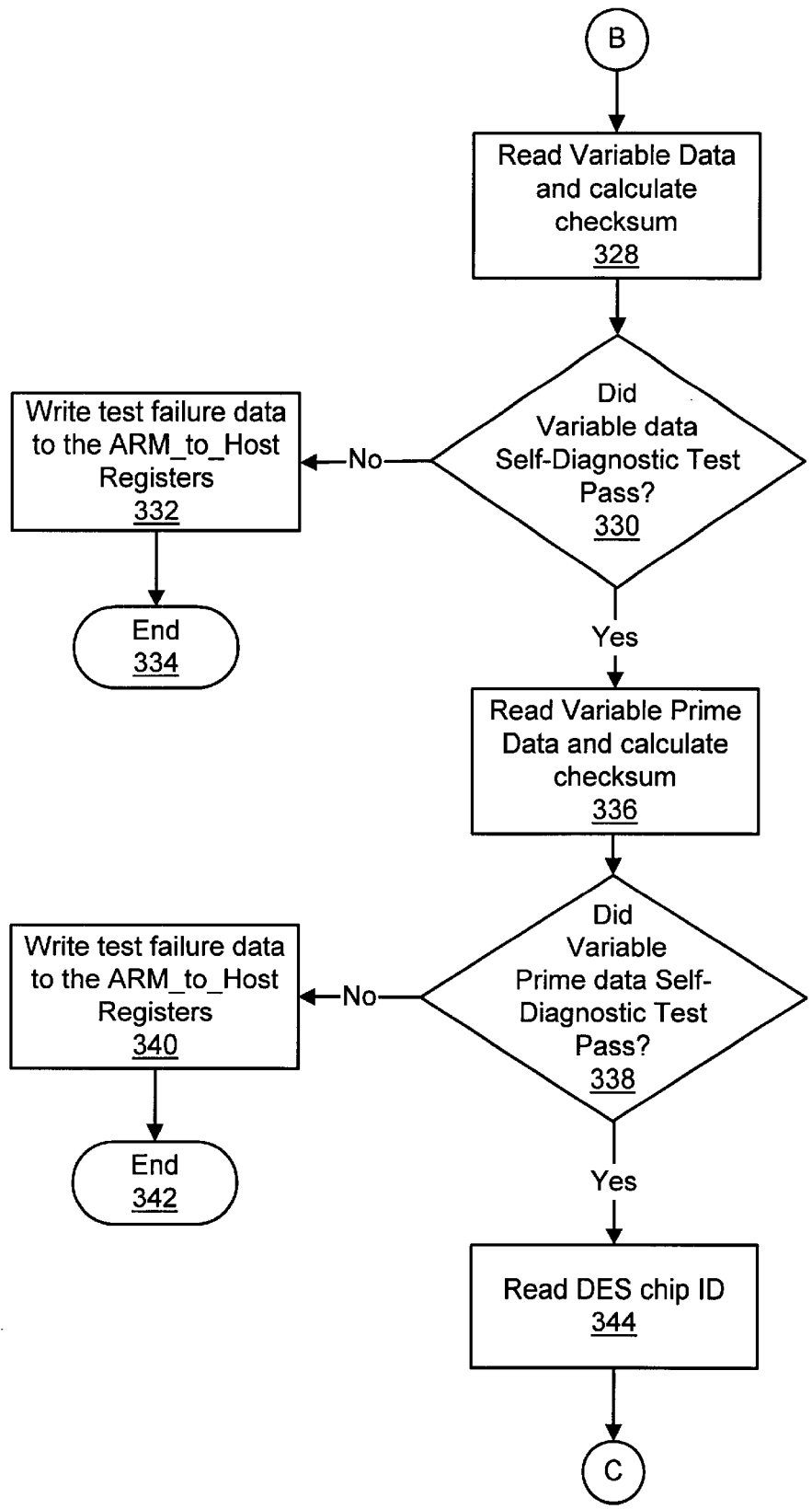
Figure 3D:
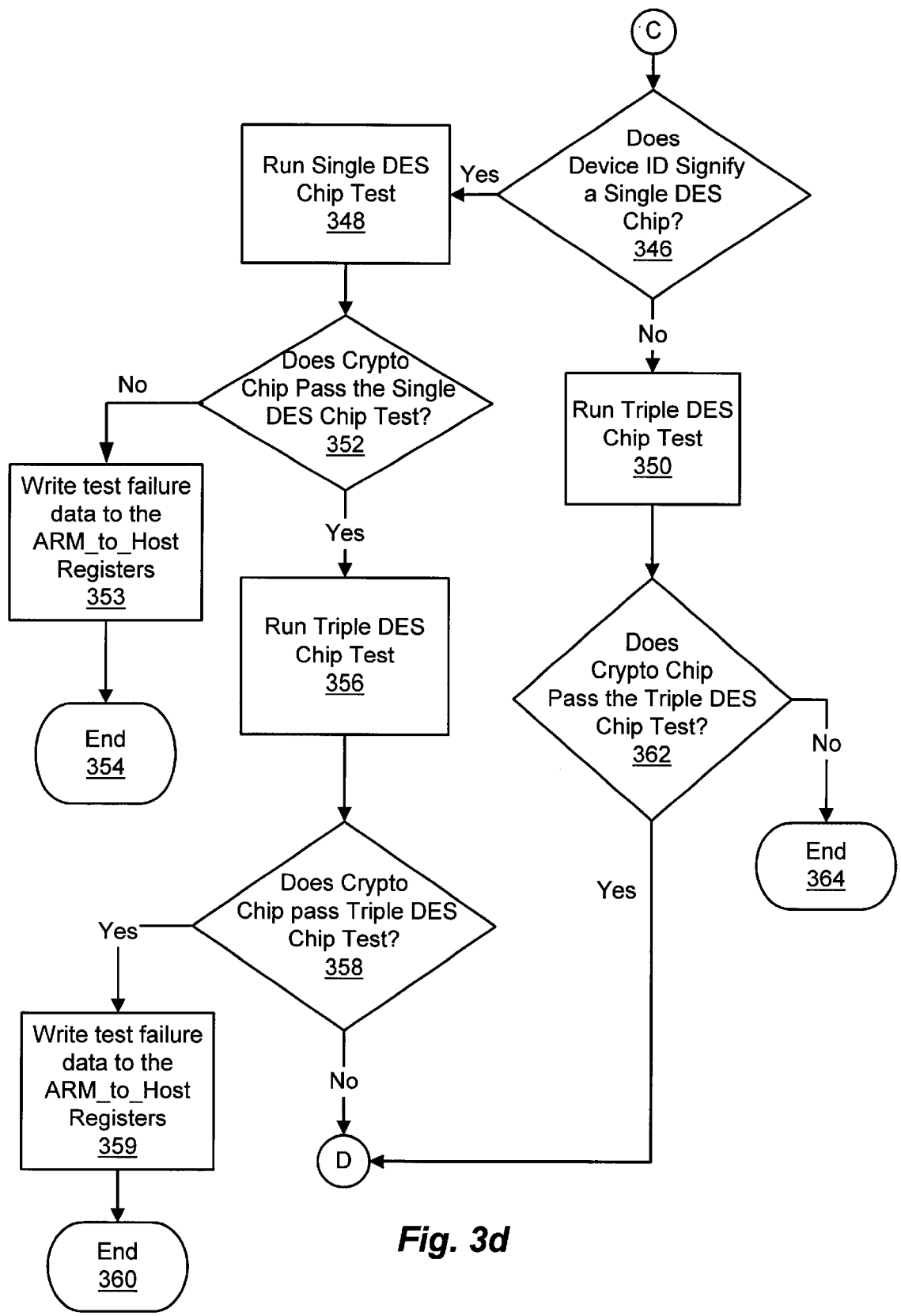
Figure 3E:
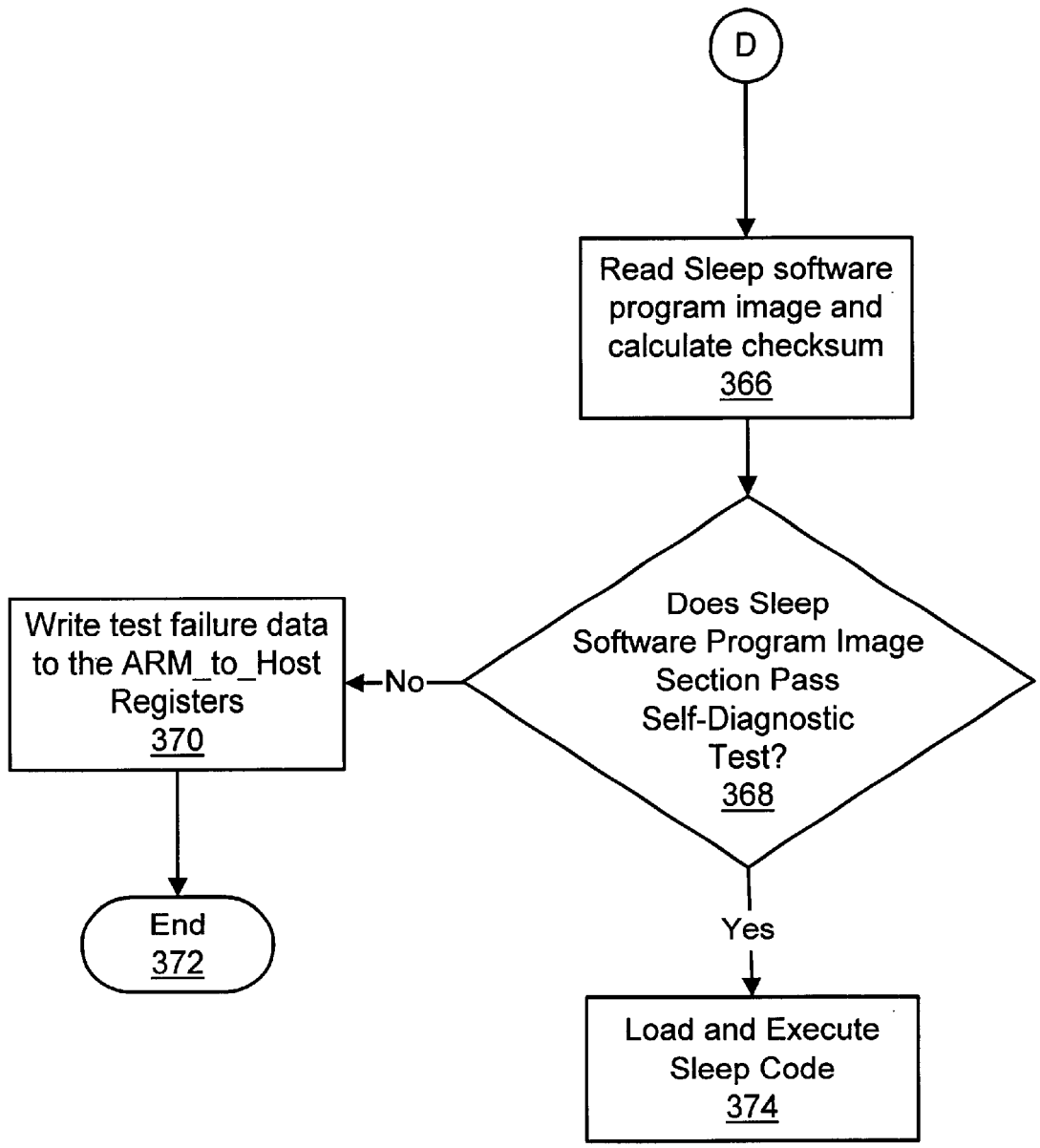

The organization of the flash RAM 32 in the presently disclosed system is illustrated in FIG. 2. In a preferred embodiment, the flash RAM 32 comprises a serial device that is organized as a paginated memory and contains 512 pages. The Flash Ram contains 264 bytes per page.

The first entry in the flash RAM 32 is a unique ASCII string 202 that may be verified by the processor to indicate that the flash RAM 32 has been loaded with the appropriate code image. The next entries in the flash RAM 32 include section headers 204. The section headers includes flash RAM 32. The first entry is a section identifier 206 that identifiers the code within the respective section. The second entry in the section headers is a section pointer 208 that provides a software pointer to the address of the first location within the section corresponding to the section identifier. In a preferred embodiment, there are a maximum of 16 sections stored within the flash RAM 32.

A static data section 210 may contain static configuration data such as the PCI device identifier, MAC address, and serial numbers and other manufacturing parameters of the NIA. In one embodiment, the NIA includes a PCI device ID which signifies the type of cryptographic processor expected to be populated on the NIA. The static data section 210 also includes a header portion located at the beginning of the section. The header portion contains a section length parameter 212, a load address 214, and a checksum 216 derived from the data stored within static section 210. Although the header portion associated with the static data section 210 contains a load address, it is not used in the presently illustrated embodiment.

Variable data section 218 may contain variable configuration data that is typically the configuration data for the NIA. This variable data may include the factory default configuration data and in one embodiment, may be modified by a user. The variable data section 218 also includes a header portion located at the beginning of the variable data section 218 containing a section length parameter 220 that defies the length of the respective section, a load address 222, that specifies the memory location in NIA memory at which to store the variable data and a checksum 224 derived from the data stored within the variable section 218. Although the section header associated with the variable data section 218 contains a load address, this load address is not used.

Variable prime data section 226 may contain factory default configuration settings for the NIA 101 that are used as a data backup for the variable data stored in variable data section 218. In one embodiment, to ensure the integrity of the data stored in this page the user is unable to over-write that data stored in this section. The variable prime data stored in variable prime data section 226 of the flash RAM 32 may be used by the host processor to rewrite certain invalid data values stored in other pages and sections within the flash RAM 32. Variable prime data section 226 includes a header portion located at the beginning of the section containing a section length parameter 228 defining the length of the respective section, a load address 230 that specifies the NIA memory address, and a checksum 232 derived from the data stored within variable prime section 226. Although the header portion contains a load address, this load address is not used.

A boot image section 234 contains the boot software for the NIA. This boot software code includes self diagnostic software code herein discussed. Preferably the boot image code is stored in contiguous pages of memory within the boot image section 234 or may be stored in contiguously linked pages. The boot image section 234 also includes a header portion located at the beginning of the boot image section 234. The header portion contains a section length parameter 236 that defines the length of the boot image section 234, a load address 238 that provides the address where the boot software code is to be loaded in NIA memory, and a checksum 240 derived from the data stored within the boot image section 234.

The sleep image code is employed to respond to predetermined messages received over the network and to transmit predetermined messages over the network when the NIA processor 24 detects that the host computer 12 has entered a reduced power state, in which the host operating system is not operational. The sleep image code may be divided into a number of sections depending on the system requirements. The sleep code may be divided into a plurality of sections and each loaded into a different RAM module in the NIA. The Sleep image-1 section 242 contains the first section of the sleep software code. The Sleep image-1 section 242 includes a header portion located at the beginning of the section. The header portion contains a section length parameter defining the length of the sleep image section 244, a load address 246 that defines the memory and address where the first section of the sleep software code is to be loaded, a checksum 248 derived from the software code stored within the sleep image-1 section 242, and a next-section-pointer 250. The next section pointer 250 provides a software pointer link to the location in the flash RAM 32 where the subsequent section of sleep software code is stored.

In the embodiment illustrated in FIG. 2 a second sleep image section, sleep image-2 section 252 is provided. Sleep image-2 section 252 provides a second section of sleep software code that will be loaded into a different RAM module than the sleep image-1 software code. A header portion is located at the beginning of the section. The header portion contains a section length parameter 254 that defines the length of the sleep image-2 section, a load address 256 identifying the memory and address into which the sleep image-2 section is to be loaded a checksum 258 derived from the software code stored within the sleep image-1 section 242, and a next-section-pointer 260. The next section pointer 260 provides a software pointer link to the location in the flash RAM 32 where the subsequent section of sleep software code is stored if a sequential section is present. It should be understood that there may be as many sections of sleep software code as needed for a given system.

The boot code contains the necessary software code for performing self-diagnostic testing of the NIA. Operation of the self-diagnostic function within the presently described NIA is illustrated in the flow diagram of FIG. 3. Referring to FIG. 3, the NIA processor 24 executes instructions out of the ROM 26 to access information contained within flash RAM 32 and, in a preferred embodiment, to transfer boot code from the flash RAM to the IRAM 28. The boot code contains the self diagnostic routines discussed in more detail below. After loading the executable self diagnostic code from the flash RAM 32 to the IRAM 28, the NIA processor 24 verifies the boot code checksum and initiates execution of the self diagnostic routines. Status information regarding the various self diagnostic tests is conveyed, if possible, from the NIA processor 24 to the host computer 12 via the ARM_to_Host registers 38.

In the event of an error during the execution of the self-diagnostic testing, the host processor 122 reads the predetermined error code written into the one or more selected PCI registers 120 associated with the failed test. The host processor may then either repair the problem causing the test or indicate to a user that an error has occurred and that at least one self-diagnostic test has failed.

A method of operation for the NIA in accordance with the present invention is depicted in FIGS. 3A–3E. In response to detection of a power-up condition, the ARM processor 24 executes instructions out of the ROM 26 as depicted in step 302 to access the ASCII string 202 and the section header 204 for the boot image. The boot software code image is located in flash RAM 32, as depicted in step 304. The ROM boot code next causes the transfer of the boot software code to the IRAM 28 as depicted in step 306. The ARM computes a checksum on the boot code that has been transferred and the code is verified as depicted in step 307. Execution of self-diagnostics within the boot code stored in the IRAM 28 is initiated as depicted in step 308.

The read/write registers are tested as depicted in step 310, and a determination is made whether the self diagnostic tests were performed successfully as depicted in step 312. If any of the register tests fail the self-diagnostic tests, an indication of the test failure is written into the ARM_to_Host registers 36 as depicted in step 314. In one embodiment, other predetermined codes may be written into other the ARM_to_Host registers 36 to provide other data relevant to the failed register test. Such data may include identifying the particular register that has failed. If a read/write register self-diagnostic tests indicate a fault the self-diagnostic test ends as depicted in step 315.

The RAM modules are tested as depicted in step 316. The self-diagnostic testing of the various RAM modules can include testing the IRAM 28, the DRAM 30 and the external RAM 34. The self-diagnostic testing is accomplished by using predetermined data patterns that can be written to and read from each RAM. One or more predetermined data patterns may also written to and read from each RAM to ensure that all states of the memory are tested.

A determination is made whether the respective RAM modules passed the self-diagnostic tests as depicted in step 318.

If a RAM module fails the self-diagnostic testing, an indication of the failure is written into the ARM to Host registers 36 for access by the host computer as depicted in step 320. Other predetermined codes may be written into the $ARM_{13}$ to_Host registers 36 to provide other data relevant to the failed register test. Such data may include the particular RAM module that has failed the self-diagnostic test and the particular address or page of that RAM module that is defective. If there is a failure in the RAM self-diagnostic tests, the self-diagnostic test ends as depicted in step 321.

The self-diagnostic testing of the code stored in the flash RAM 32 is performed to verify the flash RAM 32 contents. As discussed above, each section includes header portions that include, among other data, a checksum parameter derived from the data or executable code stored in that section. The contents of each section of the flash RAM 32 are verified by reading the contents of a particular section in the flash RAM 32 and performing a checksum on the contents. The calculated checksum is then compared to the checksum stored in the header associated with that section of the flash RAM 32. A difference between the calculated and stored checksums indicates that the contents of the respective section of memory is invalid.

The data contained in the static data section 210 is read and a checksum is calculated as depicted in step 322. This calculated checksum is compared to the checksum 216 stored in the header portion of the static data section 210 to determine if the static data image is valid as depicted in step 324.

If the calculated checksum of the data read from the static data section 210 does not match the checksum stored in the header portion, then, as depicted in step 326, an indicator that the code is invalid is written into the ARM_to_Host registers 36 for access by the host computer. Other predetermined codes may be written into other the ARM_to_ Host registers 36 to provide other data relevant to the failed static data section test. Such data may include the particular values of the two checksums. If there is a failure in the static data self-diagnostic tests, the self-diagnostic test ends as depicted in step 327.

The data contained in the variable data section 218 is read and a checksum is calculated as depicted in step 328. This checksum is compared to the checksum 224 stored in the header portion of the variable data section 218 to determine whether the variable data image is valid as depicted in step 330.

If the calculated checksum of the data read from the variable data section 224 does not match the checksum stored in the header portion, then as depicted in step 332, an indicator of a failure is written into the ARM_to_Host registers 36. Other predetermined codes may be written into other the ARM_to_Host registers 36 to provide other data relevant to the failed variable data section test, such as the values of the two checksums. If there is a failure in the Variable data self-diagnostic tests, the self-diagnostic test ends as depicted in step 334.

The host computer 12 can access the ARM_to_Host registers 36 to ascertain the nature of the failure. The host computer 12 may write variable data stored in another memory area to the flash RAM 32 to replace the defective variable data stored in the variable data section 218 of the flash RAM 32. The data written by the host computer may be contained in secondary storage coupled to the host computer such as a hard-drive, CD ROM, or any other suitable storage media. Alternatively, the ARM may access a ROM or other non-volatile memory and write the correct variable data to the flash RAM 32.

The data contained in the variable prime data section 226 is read and a checksum is calculated as depicted in step 336. This checksum is compared to the checksum 232 stored in the header portion of the variable prime data section 226 to determine whether the variable prime data is valid as depicted in step 338.

If the calculated checksum of the data read from the variable prime data section 224 does not match the checksum stored in the header portion, then as depicted in step 340, an indicator of a failure is written into the ARM__to__Host registers 36. Other information may be written into the ARM__to__Host registers 36 to provide other data relevant to the failed variable prime data section test, such as the particular values of the two checksums. If there is a failure in the variable prime self-diagnostic tests, the self-diagnostic test ends as depicted in step 342.

The self-diagnostic testing of the cryptographic system 110 may include testing both the identity and functionality of the cryptographic module contained within the NIA. PCI device ID is read from the flash RAM 32 to signify the type of cryptographic processor that is employed as depicted in step 343. This deive identifier is employed to identify characteristics of the cryptographic chip. More specifically, the type of cryptographic chip is determined by the device identifier as being a single DES chip or a triple DES chip as depicted in step 346. If the cryptographic chip is identified as a single DES chip, a single DES chip test is performed as depicted in step 348. A determination is made whether the cryptographic chip passed the single DES chip test as depicted in step 352. If the cryptographic chip fails the single DES then an indicator of the error is written to the ARM__to__HOST registers 36 as depicted in step 353, and the self-diagnostic test ends, as depicted in step 354. If the cryptographic chip passes the single DES chip test, then the triple DES chip test is performed as depicted in step 356. A determination is next made whether the cryptographic chip has passed the triple DES chip test, as depicted in step 358. If the cryptographic chip has passed the triple DES chip test, then the wrong chip has been installed on the NIA.

An indicator of this circumstance is written to the ARM__to__HOST registers 36 as depicted in step 359 and the self-diagnostic test ends as depicted in step 360.

If the cryptographic chip is identified as not a single DES chip in step 346, then the triple DES chip test is run as depicted in step 350. A determination is made whether the cryptographic chip has passed the triple DES chip test as depicted in step 362. If the cryptographic chip fails the triple DES chip test, the execution of the self-diagnostic testing ends as depicted in step 364.

If the proper cryptographic chip has been installed and the self-diagnostic cryptographic chip test is performed without an indicator of a fault, the software code image contained in the sleep image-1 section 242 is read and a checksum is calculated as depicted in step 366. This checksum is compared to the checksum 248 stored in the header portion of the sleep image-1 section 242 to determine if the sleep image code is valid as depicted in step 368.

If the calculated checksum of the data read from the sleep image section 242 does not match the checksum stored in the header portion, then as depicted in step 370, an indicator of an error is written into the ARM__to__Host registers 36. Other predetermined codes may be written into the ARM__to__Host registers 36 to provide other data relevant to the failed sleep image section test, such as the particular values of the two checksums. If there is a failure in the sleep program image self-diagnostic tests, the self-diagnostic test ends as depicted in step 372.

The host computer 12 may read the predetermined codes written to the ARM__to__Host registers 36 to identify a failure of the sleep image-i section test. The host computer 12 may optionally write a valid sleep software program image to the flash RAM 32 to replace the defective sleep software program image in response to the detection of a sleep image code checksum error.

As discussed above, there may be several sleep images corresponding to a number of different RAM modules within the NIA that the sleep image is to be loaded into. Each sleep image section is validated as described above, and the next section pointer 250 is used to locate each subsequent sleep code section. This process therefore is repeated for each sleep image section stored in the flash RAM 32. If there is a failure in any other section of the sleep software program image self-diagnostic tests, the self-diagnostic test will end.

Upon completion of the self-diagnostic tests the NIA processor 24 initiates loading of the sleep software program image and commences execution of the respective sleep image.

Those of ordinary skill in the art will appreciate that variations to and modifications of the above-described methods and apparatus may be made without departing from the inventive concept disclosed herein. Accordingly, the invention should be viewed as limited solely by the scope and spirit of the appended claims.

What is claimed is:

1. A method for performing at least one self-diagnostic test on a network-interface-adapter comprising:
   accessing by a processor contained within said network interface adapter a self diagnostic code image stored within a first memory contained within said network interface adapter;
   storing said self diagnostic code image in a second memory contained within said network interface adapter;
   imitating by said processor said self diagnostic code image;
   providing an output indicator to a host computer coupled to said network interface adapter information indicative of faults detected during said execution of said self-diagnostic code image;
   testing said self diagnostic code image to determine whether the software is an invalid code image; and
   in the event that said software image is an invalid code image, obtaining software code that comprises a valid self diagnostic code image from a third memory and storing said code image in said first memory.

2. The method of claim 1 further including the steps of:
   testing by the processor contained within the network interface adapter of a plurality of data stored in said first memory to determine whether the data is invalid; and
   in the event that said data is invalid, obtaining a plurality of data that comprises a valid plurality of data from a third memory and storing said code in said first memory.

3. The method of claim 2 wherein the step of testing includes:
  associating a first data validating parameter to a plurality of data stored in said first memory, said first data validating parameter being derived from a valid plurality of data and being stored in said first memory;
  deriving a second data validating parameter associated with the plurality of data tested by said processor;
  comparing the second data validating parameter derived by the processor with the first data validating parameter associated with the plurality of data stored in the memory; and
  in the event that said second data validating parameter does not equal said first data validating parameter, indicating to the host computer that the plurality of data stored in the memory is invalid.

4. The method of claim 3 wherein the first data validating parameter is a checksum derived from the valid plurality of data stored in the memory.

5. The method of claim 3 wherein the second data validating parameter is a checksum derived from the plurality of data tested by the processor.

6. The method of claim 3 wherein the step of indicating to said host computer includes writing data to at least one register readable by said host computer.

7. The method of claim 3 wherein the step of indicating to the host computer includes providing the information over a computer data network, the computer data network providing data communication between the processor and the host processor.

8. An apparatus for performing a self-diagnostic test on a network interface apparatus and for repairing at least one error condition, the apparatus comprising:
  a network interface processor;
  a memory containing a plurality of data coupled to the network interface processor,
  a host processor coupled to the network interface processor;
  the network interface processor operative to perform a self-diagnostic test on at least a portion of the data stored within the memory and further operative to provide the host processor with a predetermined error code associated with the at least one failed self-diagnostic test of the memory; and
  the host processor operative to correct a at least one of the plurality of predetermined failure modes of the at least one self-diagnostic test of the memory.

9. The apparatus of claim 8 further comprising:
  a register coupled to the network interface processor and to the host processor, the network interface processor being operative to write to the register a predetermined error code associated with the at least one failed self-diagnostic test and the host processor being operative to read from the register the predetermined error code associated with the at least one failed self-diagnostic test.

10. The apparatus of claim 9 wherein a computer data bus couples the register to the network interface processor and to the host processor.

11. The apparatus of claim 10 wherein the computer data bus is a PCI bus.

12. The apparatus of claim 8 wherein the memory is a flash RAM.

13. The apparatus of claim 8 wherein the memory is a paginated memory having at least one page.

14. The apparatus of claim 13 wherein the at least a portion of the data stored within the memory is contained within one page.

15. The apparatus of claim 13 wherein a section of the memory storing the at least a portion of the data includes an associated header portion containing a checksum and length derived from the section of the memory containing the at least a portion of the data.

* * * * *

UNITED STATES PATENT AND TRADEMARK OFFICE
CERTIFICATE OF CORRECTION

PATENT NO. : 6,539,338 B1
DATED : March 25, 2003
INVENTOR(S) : Heidi R. Pickreign et al.

It is certified that error appears in the above-identified patent and that said Letters Patent is hereby corrected as shown below:

Column 6,
Line 11, "ARM to Host" should read -- ARM_to_Host --;
Line 14, "$ARM_{13}to\_Host$" should read -- ARM_to_Host --, and Column 8,
Line 13, "image-i" should read -- image-1 --.

Signed and Sealed this

Fifth Day of April, 2005

JON W. DUDAS
*Director of the United States Patent and Trademark Office*